United States Patent [19]
Hyndman et al.

[11] Patent Number: 6,161,136
[45] Date of Patent: Dec. 12, 2000

[54] HIGH PERFORMANCE USER INTERFACE AND METHOD OF STRUCTURING SAME

[75] Inventors: Arn Close Hyndman; Omar G. Ocampo, both of Ottawa, Canada

[73] Assignee: Nortel Networks Limited, Montreal, Canada

[21] Appl. No.: 09/173,033

[22] Filed: Oct. 16, 1998

[51] Int. Cl.$^7$ .................................................. G06F 13/00
[52] U.S. Cl. .......................... 709/223; 709/203; 709/219
[58] Field of Search .................... 709/203, 218, 709/219, 223, 217, 224, 311, 316; 345/340; 379/201

[56] References Cited

U.S. PATENT DOCUMENTS

| | | | |
|---|---|---|---|
| 5,887,139 | 3/1999 | Madison, Jr. et al. | 709/223 |
| 5,926,177 | 7/1999 | Hatanaka | 345/340 |
| 5,978,842 | 11/1999 | Noble et al. | 709/218 |
| 6,028,602 | 2/2000 | Weidenfeller et al. | 345/340 |
| 6,038,301 | 3/2000 | Nightingale | 379/201 |
| 6,038,590 | 3/2000 | Gish | 709/203 |

*Primary Examiner*—Zarni Maung
*Assistant Examiner*—Thu Ha Nguyen
*Attorney, Agent, or Firm*—Aprilia U. Diaconescu; Allan P. Millard

[57] ABSTRACT

The user interface is divided into client-server portions, based on the multilevel model-view-controller (MMVC) architecture. The MMVC architecture results in a high performance user interface that addresses the problem of how to divide functionality, and introduces performance issues in a distributed or three-tier architecture. This division of concerns results in a dramatic reduction in the size of the component which runs on the user's terminal, resulting in lighter weight client interfaces, that are flexible and powerful and does not require to have a high bandwidth connection to the server. Thus, the user's terminal may be a low-end personal computer with a dial-up access to the Internet service provider. This layered structure may be built over an existing network manager provided with a graphical user interface.

9 Claims, 6 Drawing Sheets

HIGH PERFORMANCE USER INTERFACE AND METHOD OF STRUCTURING SAME

BACKGROUND OF THE INVENTION

1. Field of the Invention

The invention is directed to a network management system and more particularly to a multi-tiered architecture for a user interface.

2. Background Art

Modern networks are comprised of heterogeneous network elements (NEs), the physical hardware connections between NEs, and the software used to send, receive and route data.

Numerous problems may arise in a network, such as traffic overload on parts of the network, optimum placement of network resources, security, detection of network faults, etc. It is therefore known to provide the network with a network management system to receive real time information regarding the status of the network elements and systematize this knowledge such that common problems can be detected, isolated and repaired, either automatically or by the maintenance personnel.

Inspired by the technological and architectural advances in data communication and in particular in the telecommunication world, network management systems are rapidly evolving toward highly distributed, multi-vendor systems, with open interfaces, and applications that are independent from the underlaying transport technologies. The fundamental driver for this evolution is the need to develop and deploy highly scalable new services in a rapid and cost-effective manner.

The intent of the network management tools is to provide a centralized view of the network, enabling correlation of events and conditions that span the network elements and subnetworks, as well as to facilitate the management of a non-homogenous collection of network elements.

Modern network managers maintain a complete and up-to-date representation of the network and the technologies involved. It is essential for a user to have access to this information for using this real-time knowledge efficiently. An important aspect of a network management system is the way this information is presented to the user and the degree of interaction permitted between the user and the network, in other words, the network-user interface.

In general, the user interface resides at the client terminal and is adapted to communicate with the reminder of the system. Network information is presented on a screen using icons, and the user has the ability to select additional information about a particular object model, including object models of network equipment and connectivity between the equipment, in a clear and well-organized, condensed way.

Large networks and complex network management functionality often results in client applications that are large, slow to respond and expensive to operate. The division of large applications into three tiers, namely UI, business logic, database/network, is the most common solution to this problem. However, the three-tier architecture typically results in poor UI performance or large UI clients.

Other ad-hock solutions are possible, but they require a new creative effort for each application and may be hard to implement. They also typically fail to provide a clean separation of concerns.

U.S. Pat. No. 5,375,199 (Harrow et al.) issued on Dec. 20, 1994 and assigned to Digital Equipment Corporation discloses a system monitoring device which displays historical and real time information and allows a user to interactively manipulate the information being displayed.

U.S. patent application Ser. No. 08/764,086 (Planas et al.) filed on Dec. 6, 1996 and assigned to Northern Telecom Limited, discloses a GUI able to present a large number of NEs to the user and the tools used to perform maintenance, surveillance, and administration of the network. Tasks performed include alarm monitoring, test and diagnosis of faults, performance monitoring, connection management, accounting, and security operations.

However, these patents are not concerned with separating the user interface into a client and a server part for reducing the size of the software on the user's terminal.

There is a need for a high performance and feature rich user interface, which does not burden the client terminal with a large piece of software and which does not use high bandwidth for connection to the server.

SUMMARY OF THE INVENTION

It is an object of this invention is to provide a high performance user interfaces divided into client-server portions, based on the multilevel model-view-controller (MMVC) architecture. The client portion is called user interface client (UIC) and the server portion is called user interface server (UIS).

It is another object of this invention to provide a high performance, lightweight user-network interface client, which runs on the customer's host terminal. In this way, the terminal may be a low-end personal computer with a dial-up access to an Internet service provider.

According to one aspect of the invention there is provided a user interface for a network management system of a communication network, comprising a server for storing the state of the user interface as a whole, marshalling data, and interacting with the remaining of the network management system, a client layer for using the server for refreshing a current display presentation of network data to a user, and for transmitting commands selected by a user on the current display presentation to the server.

According to a further aspect of the invention, there is provided a method of structuring functionality of a user interface for a network management system of a communication network into a multilayered model-view-controller pattern, comprising separating the user interface into a server and a client layer integrating the state information on the server in a high-level model, integrating the state information on the client layer as a high-level view, and integrating a data marshalling mechanism provided by the network management system as a high-level controller.

Advantageously, use of the MMVC architecture according to this invention allows a network provider to achieve dramatic reduction in the size of the component which runs on the user's terminal, resulting in lighter weight client interfaces that outperform the solution currently known. The resulting user interface client is flexible and powerful, while the client does not need to be large or have a high bandwidth connection to the server.

Furthermore, the MMVC architecture is better suited than the three-tier approach to assist the network developer in management of large networks—3-tier solves the problem of how to divide functionality, but introduces performance issues in a distributed environment. MMVC structure may be built over an existing network manager (NM).

Still another advantage of the present invention is that the multilayered architecture at the user interface layer is easy to implement and maintain, due to clear separation of concerns.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Throughout this specification, the terms listed below have the following meaning.

User is a human being who uses a program or a service. A client also uses something, but is not necessary a person, it can be a program.

The term service means an abstract specification of some action to be performed. A process, which performs those actions, is called a server. For example, a client contacts a server on behalf of a user.

Often, network applications comprise two parts, one program which runs on one machine and requests a remote service, and another program which runs on the remote machine and performs that service. These are called the client side and the server side of the application. At a given time, there may be more servers performing a given service these usually run on different machines.

An important change from the prior art architectures resides in the separation of the user interface (UI) into a server layer and a client layer user interface, namely the user interface server (UIS) and the user interface client (UIC).

Another key feature of the architecture used for the user interface according to the invention is that it follows a multilevel model-view-controller (MMVC) pattern, rather than a MVC pattern. As a result, the amount or communication required between the client (the view), the server (the controller) and database/network (the model). MMVC is a nested MVC is considerably reduced. At each level a view contains another MVC pattern. MMVC also supports multiple views on the same data.

Figure 1A:
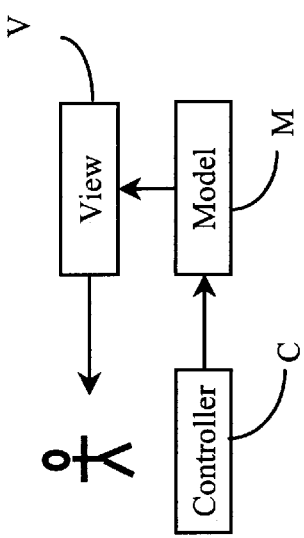
FIG. 1A shows a high-level model-view-controller.

FIG. 1A shows a high-level industry standard MVC architecture. At the high level, the two parts of the user interface according to the invention, namely the UIC and UIS, follow this MVC pattern. The UIS state information forms the model, denoted with M, and the data marshalling mechanism is the controller, denoted with C, and the view is the UIC portion of the interface, denoted with V.

Figure 1B:
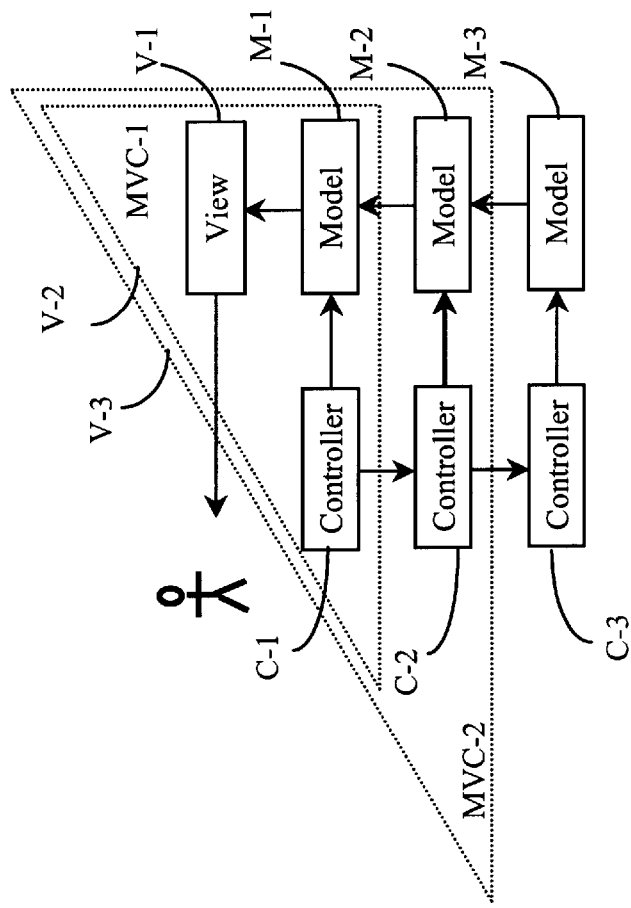
FIG. 1B illustrates a high-level multilayered model-view-controller according to the invention.

FIG. 1B illustrates the next level of the MMVC architecture according to the invention. For example, MVC-1, comprising view V-1, model M-1 and controller C-1, is the view V-2 for the next level MVC-2. MVC-2, comprising view V-2, model M-2 and controller C-2, is the view V2 for the next level MVC-3. This continues until the finest granularity for any given system.

If the MMVC pattern is applied to the structure shown in FIG. 1B, at a high level, the view V-2 of the MVC-2 is the UIC state information, the model M-2 is the UIS and the controller C-2 is the data marshalling mechanism for the various applications provided in the MN.

The high level view V-2 is actually broken down into one or more views, responsible for drawing user interface components. The view V-2 (UIC) is itself a model-view-controller, where the model M-1 is a cache for a portion of the data stored in the main UIS model M-2. It caches the state information only as necessary to achieve the performance demanded for user interactions.

UIC comprises one or more mini-controllers C-1 that interact both with the model cache M-1 and the controllers C-2 on the server, to ensure that both models are kept in synchronization. A selection management functionality is responsible for providing a list of the currently selected object identifiers to clients. Only objects selected in the active window are returned. UIC updates the cache of data needed for currently visible objects, which is kept up-to-date through a generic event system.

Figure 2:
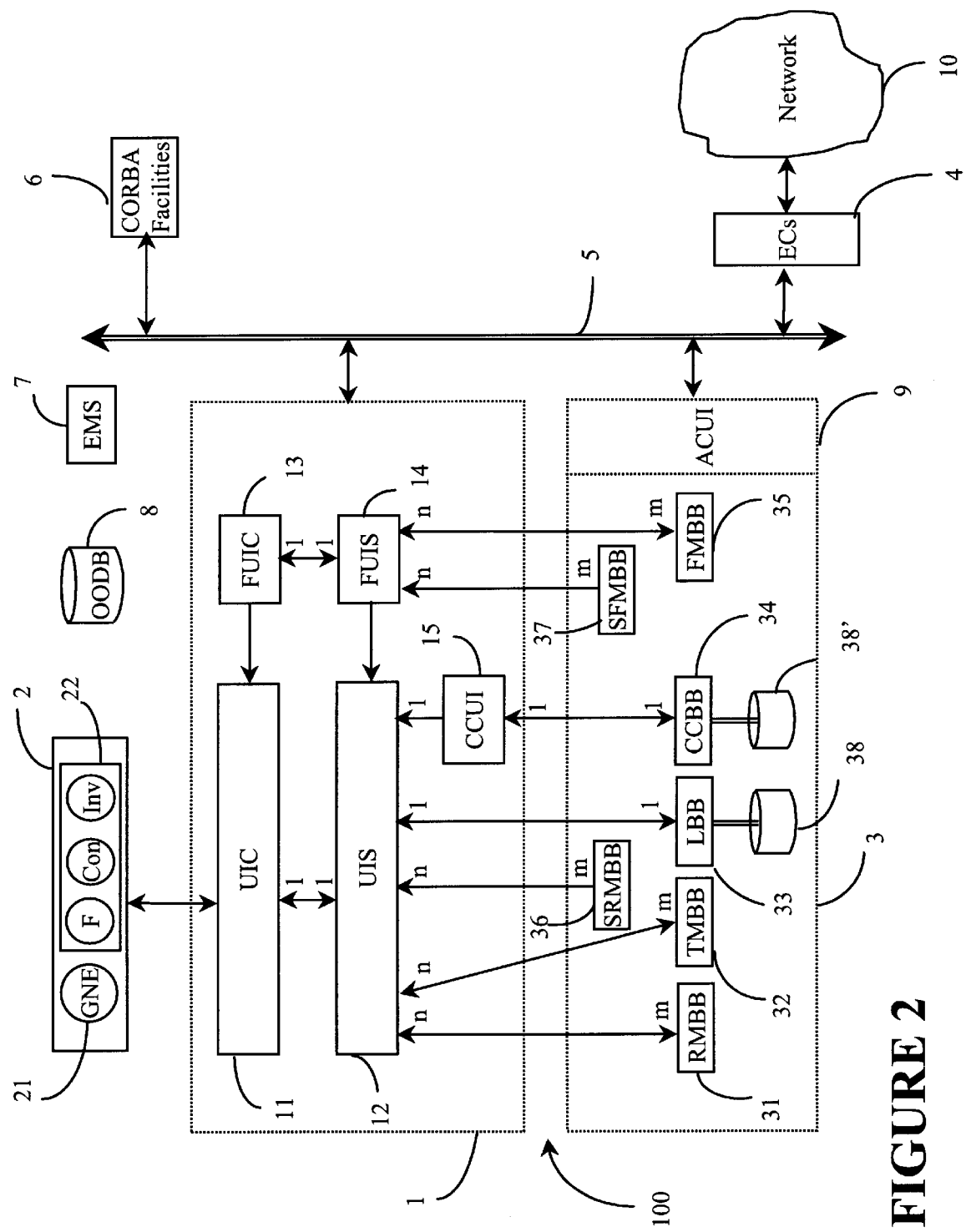
FIG. 2 shows a simplified view of a network management system with MMVC.

FIG. 2 shows a block diagram of a network management product 100 where the nested architecture according to the invention is applied. While the description of the invention is made in the following for the NM 100 configured as shown in FIG. 2, it is to be understood that the invention is not restricted to the configuration of NM 100, but may be applied to any other distributed client-server application with a GUI.

Network manager 100 is based on common object request broker architecture (CORBA) technology, and comprises a user network interface 1, a graphical user interface (GUI) 2, application building blocks (BB) 3 and element controllers 4, which could be managed object agents (MOA) or operation controllers (OPC).

GUI 2 comprises two graphical user interfaces, namely a graphical network editor (GNE) 21, and a graphical network browser (GNB) 22 which delivers functions such as surveillance, connection provisioning (block marked Conn), inventory (block marked Inv), performance monitoring (block marked F) and software delivery.

A main window of NM 100 comprises a network display with the graphical representation of the objects, a group tree, with a tree representation of the group hierarchy, and a corral, with objects having no set position. The user can put network objects that do not currently belong to any group in the corral.

Building blocks (BBs) 3 incorporate a collection of logical oriented building blocks, such as RMBB 31 (resource management BB), TMBB 32 (trail management BB), LBB 33 (layout BB), CCBB 34 (custom command BB), and FMBB 35 (fault management BB). BBs 3 also include logical oriented building blocks, such as SRMBB 36 (service resource management BB), and SFMBB 37 (service fault management BB).

Element controllers (ECs) 4 are network element management software entities that consolidate and adapt information from the network under their control, being provided to support multi-vendor multi-technology NEs. ECs 4 manage network 10, or subnetworks, network elements (NE), links, and shelf-based equipment.

The object request broker interface, generically shown at 5, is used as a distributed computing infrastructure to create applications that readily interact within CORBA environment, with minimal technology dependencies. CORBA interfaces are used where communicating components may be written in different languages.

Block 6 shows generically services that may be provided by CORBA, such as event, life cycle, transaction, concurrency control, security services, etc.

An element management system (EMS) 7 manages applications and the platforms on which they run. EMS 7 of NM 100 comprises four types of management disciplines: availability, deployment, application management, and security management.

Network manager 100 uses a distributed database, where information used by a BB is stored at the respective BB, so that it can make use to obtain an accurate, up-to-date view of the configurations of all the network elements it controls. An object-oriented database 8 is however introduced in the architecture for persistent storage of network level objects that cannot be derived or stored in the network.

Access control user interface (ACUI), shown by reference numeral 9, allows the administrator of the network to limit what users can see and can do. A generalized control interface is provided at each BB for managing the access control related to the resources and functions it provides.

FIG. 2 shows service and network management user interface (UI) 1, which employs facilities provided both by service and network layers.

The server layer comprises user interface server (UIS) 12 that provides the user interface storage and logic to support the client layer. In broader terms, UIS 12 comprises a collection of building block controllers which interact with the BBs 3, for storing the state of the user interface as a whole, marshalling data, and interacting with the remaining of the network management system.

The client layer comprises user interface client (UIC) 11 that uses the services of the server layer and is responsible for presentation of network data to the user and for general interaction with the user. UIC 11 manages only enough data to refresh the current display and to prevent excessive messaging.

UI 1 also comprises fault user interface, which follows a similar model, in that it has a client part FUIC 13 and a server part FUIS 14. The FUIC 13 is used for presentation of alarms and related user interactions. The FUIS 14 comprises the logic and BBs communication to support requests from the user through the FUIC. This is because the fault details dialog is treated in NM 100 as a separate entity, preferably deliverable independent of the rest of the network management system web interface. FUIC and FUIS manage communications to the fault BBs on its own. However, FUIC and FUIS may be designed as part of the UIC and UIS, respectively. Once the FUIC is created, it starts its own server component and operates without dependencies on the UIC or UIS.

Providers can define custom commands which are loaded from the CCBB 34 (Custom Command BB) at UIS start up. The custom command controllers are responsible for catching custom command events, parsing the URL for parameters and replacing them with data stored in the UIS. Finally, the custom command controller will generate a display URL event which will be caught by the view responsible for displaying the URL at the UIC.

A custom command user interface (CCUI) 15 provides user configuration of custom commands, and is not broken into user and server parts in NM 100.

Each UIS 12 has exactly one UIC 11, shown by figure "1" at the ends of the bidirectional arrow between these blocks. Each UIS 12 on the other hand, can use any number of fault and resource management building blocks, shown by letters "n" at the UIS and by letter "m" at the respective BB. As an exception, UIS 12 uses the services of one LBB 33 and one CCBB 34, and there is only one CCUI (custom command user interface) 15 per CCBB 34.

Preferably, UIS 12 runs on the same host computer as the providers web server in order to comply with security restrictions. UIC 11 runs within a web browser on any computer with access to the web server.

Three main types of graphical objects are manipulated by the UI 1 of network manager 100, namely network, group and paint objects. Network objects are the objects advertized by the resource management BBs, such as physical and service nodes, connectivity links between physical or service nodes, etc. Group objects are objects advertized by the layout BB and created by the user. Groups are container objects which contain network, paint and other group objects and can be of variable sizes. Paint objects are objects advertized by the LBB and created by the user, such as simple graphic objects, floating text, etc.

The model of the UIS (M-2 in FIG. 1B) keeps the state of all objects the user has access to, and propagates any state changes that occurs to objects currently being displayed. The state of an object can be affected by a message from a BB or by a user command.

An acyclic direct graph with an associated event propagation mechanism provides a shared infrastructure for a large number of features. When the graph is updated, the direction of data flow is from the building blocks 3, through the UIS 12 to the UIC 11 for display to the user.

The graph event propagation mechanism allows events to travel to nodes up or down the graph hierarchy. Certain types of events that are received at a node may be allowed to continue to propagate through the hierarchy, other types may be intercepted. This graph event propagation mechanism also allows filtering and collation of graph events.

Figure 3:
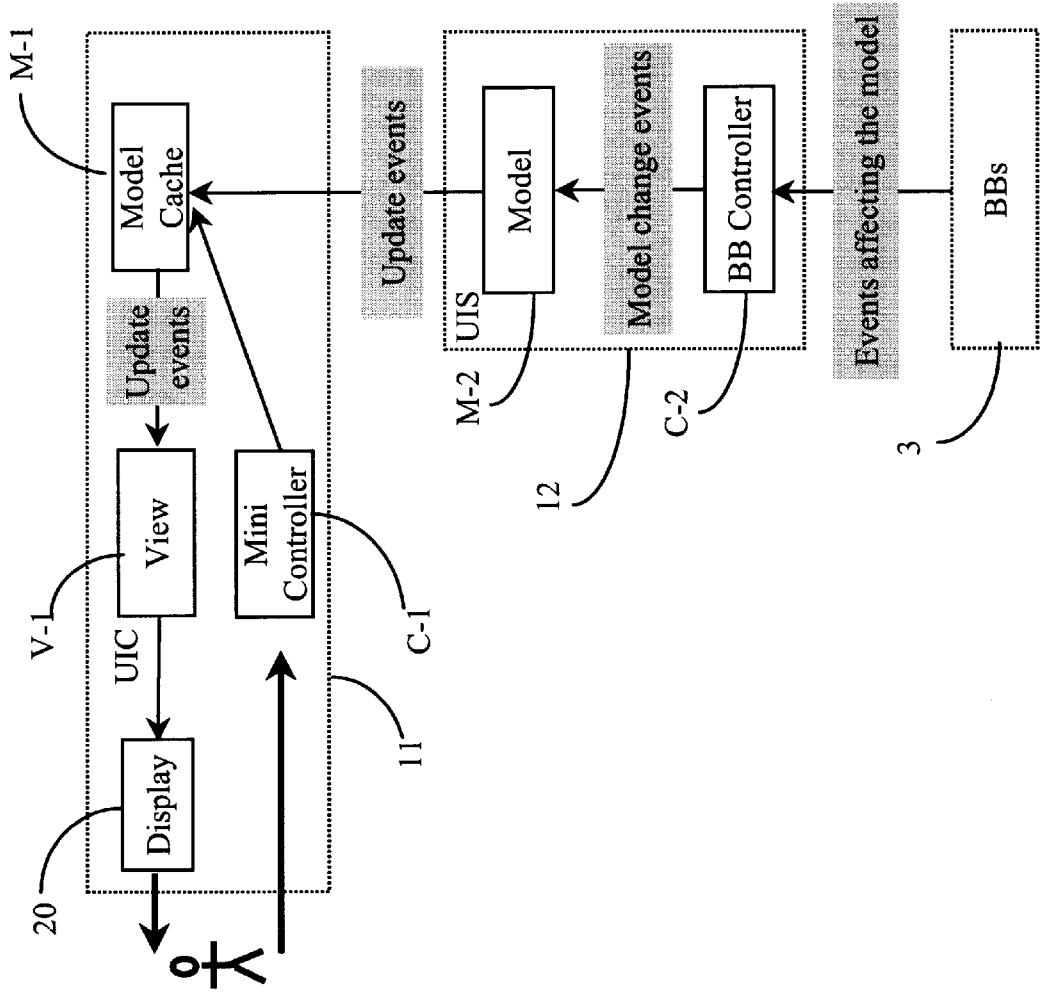
FIG. 3 illustrates the event stream between UIC and UIS.

The data flow for event updates is shown in FIG. 3. BB controllers C-2 of UIS 12 receive data coming in from various BBs 3 regarding events affecting the models. Models M-2 receive model change events from the BB controllers C-2 and provide enough system state information (update events) to drive UIC 11. Update events are presented to view V-1 and to the user.

Figure 4A:
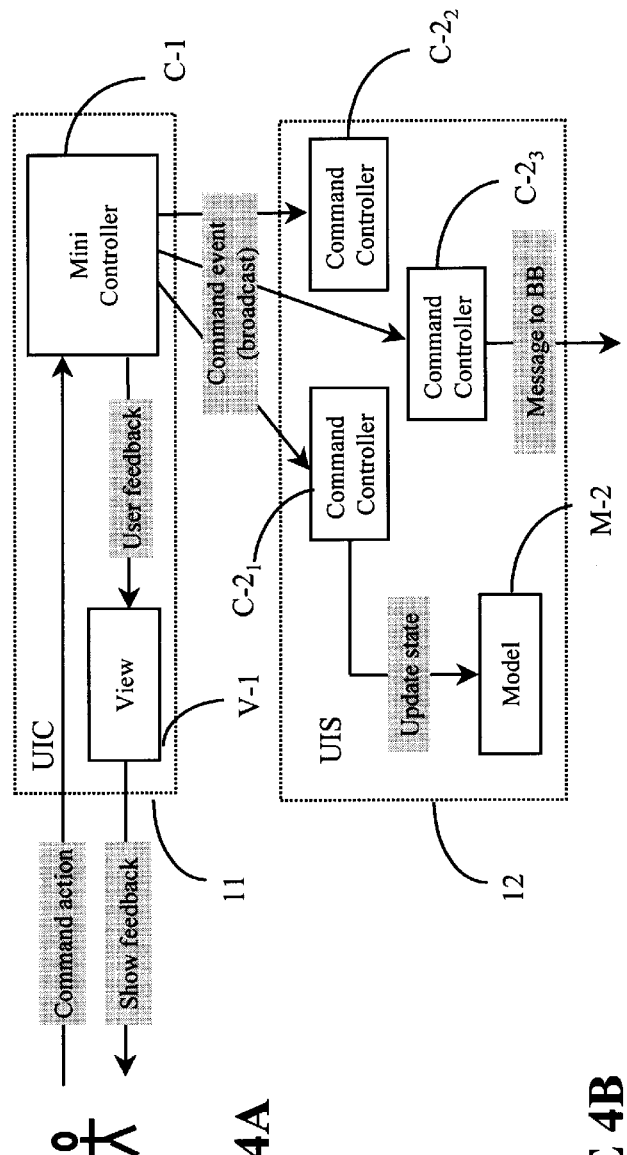
FIG. 4A shows the data flow between UIC and UIS for command processing.
Figure 4B:
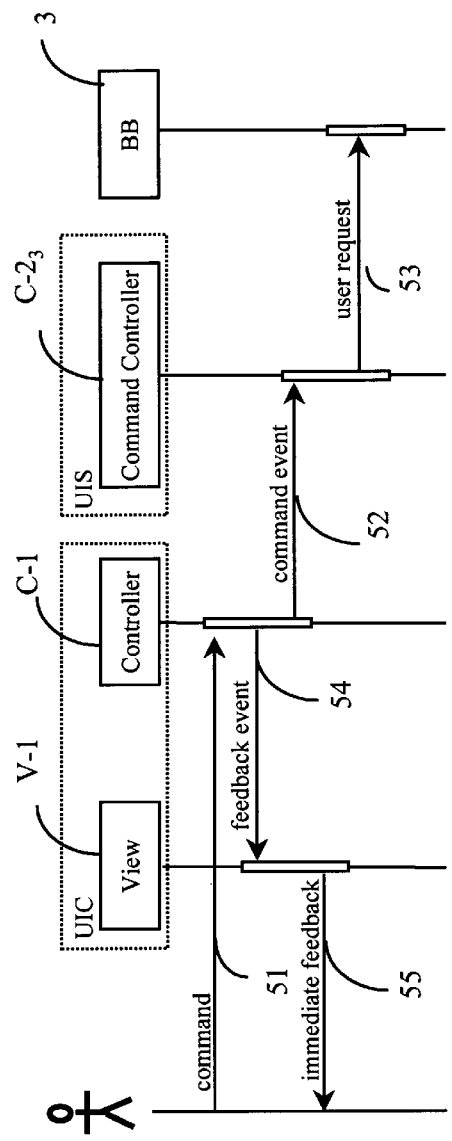
FIG. 4B illustrates a scenario diagram for execution of a command.

FIG. 4A shows the data flow between UIC and UIS for command processing. The command scenario is illustrated in FIG. 4B, which shows the behaviour of the command processing system when a user executes a command involving a BB. An example would be acknowledging an alarm.

The user executes a command by selecting a menu, double clicking on an object, or clicking on some other control on the user interface, shown in step 51. This user action is caught by the controller component C-1 of the UIC 11, converted to a command event and broadcast, as shown in step 52.

Command controllers C-2 register for particular command events to perform a requested service. The command event is received, for example, by controller $C-2_3$ of the UIS 12. This service may result in changes to the UIS model M-2, shown by "update state" block on FIG. 4A, or may result in an interaction with a BB, shown by "message to BB" block.

When the command involves an interaction with a BB, the respective controller $C-2_3$ sends a command event to a destination BB 3, shown in step 53.

Controller C-1 is also responsible for initiating immediate generic user feedback, actually handled by the view component V-1, shown in steps 54 and 55, so that the user is notified that the command is being processed. This generic immediate feedback mechanism prevents users from inadvertently executing the same command several times before receiving a response due to network delays.

Figure 5A:
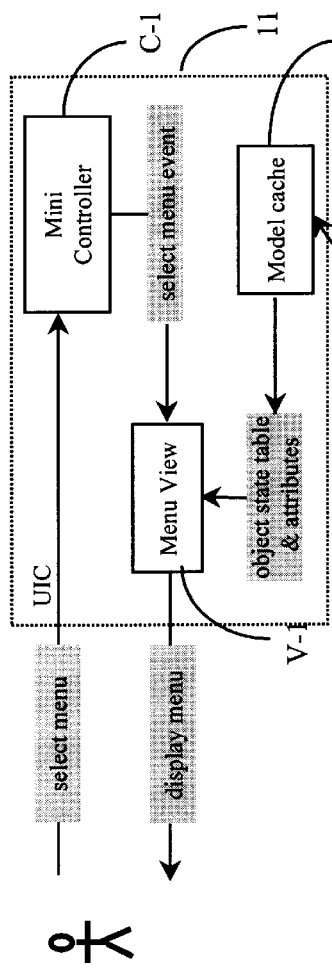
FIG. 5A shows the data flow between UIC and UIS for menu selection display.

FIG. 5A shows the data flow diagram for menu display. For usability reasons a menu must display almost instantaneously after the user request it. Menus must also respond to the state of the system in order to add/remove menu entries and to "grey out" menu entries that do not currently apply. This requires UIC 11 to store considerable state information with the knowledge required to configure the menus appropriately, which results in an increased "weight" for the UIC.

The solution according to this invention is to maintain menu state information, not system information at the UIC. Each class of objects that supports a menu has its menu entries uploaded to the UIC at initialization.

Instances of objects that support menus have an object state table cache that is continuously maintained by events sent from the UIS. The object state table contains information about which menu entries are currently visible and which are grayed out. The object state table and information about the current selection set are used to configure the object menu entries displayed to the user.

The UIS menu model is initialized by querying the CCBB 34 for custom menu entries and by requesting the set of allowed functions for each object and the respective user from the access control component.

Figure 5B:
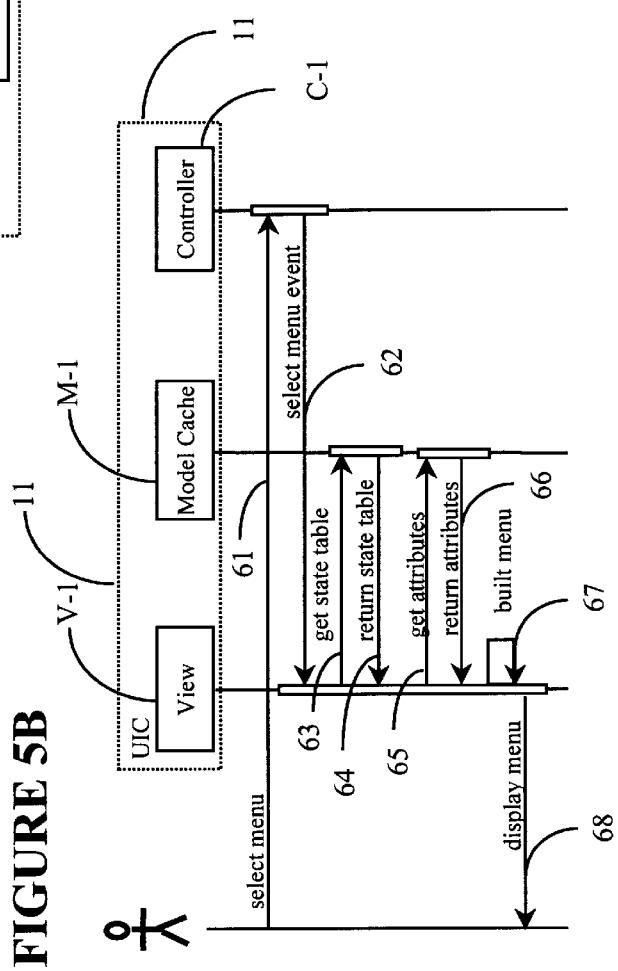
FIG. 5B shows a scenario diagram for menu selection display.

The menu object scenario in FIG. 5B shows the steps taken to display a menu. All menu display processing occurs in the UIC.

Object menus are based on a menu defined for the class, so that a mechanism is provided to handle menu entries which refer to attributes of the object instance. If such menu entries are required, as shown in step 61, it is possible to include parameters in the class menu definition that are replaced with object attributes that are stored in the model cache M-1 at the time the menu is constructed, as shown in steps 63 to 66. For example, an <object name>parameter may be provided in the UIC and filled in with the network element name from M-2 when the respective object menu is displayed. After the menu is built, step 67, it is displayed by view V-1 on the user's terminal.

Figure 6:
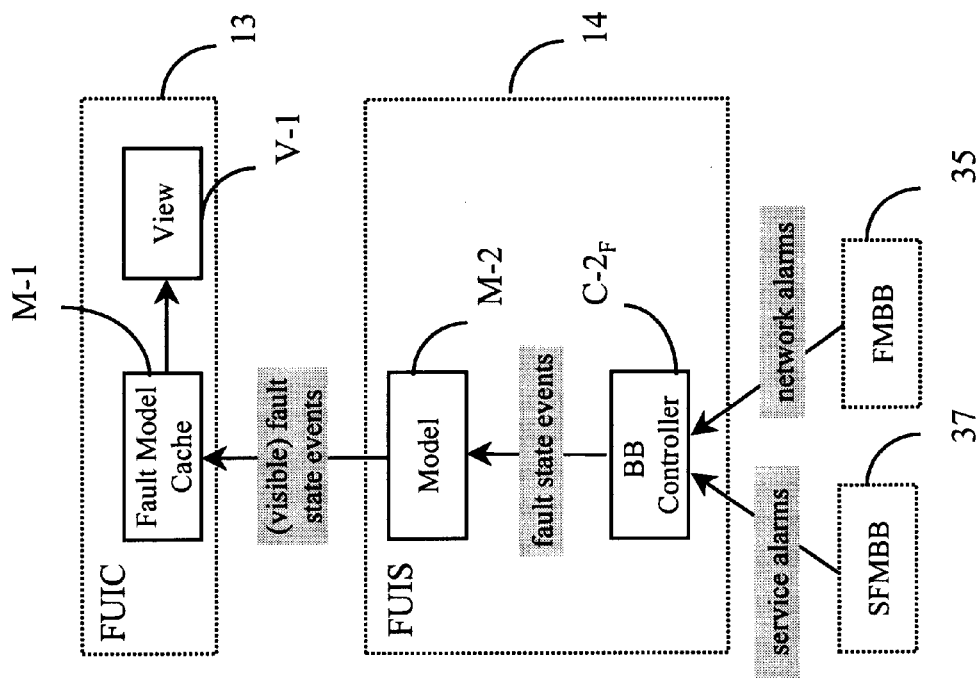
FIG. 6 shows the data flow between UIC and UIS for the fault model.

FIG. 6 shows the flow diagram of the fault model. Events propagating from the fault BBs such as FMBB 35 and SFMBB 37 are collected by FUIS 14 and translated into internal events. FUIS model M-2 catches these events and uses them to maintain fault summary information for the user's entire layout. Fault summary events are sent from FUIS 14 to FUIC model cache M-1 only for objects that are currently being displayed.

The state of a particular layout is maintained in the FUIS model, which uses a generic graph. Fault summary objects (e.g. storing alarm counts) are associated with the nodes of this graph. These fault objects use the generic graph propagation mechanism to maintain group summaries efficiently.

If the user acknowledges alarms on an object in the UIC, a command event is generated and caught by an alarm acknowledgement controller in the UIS 12. This component uses the fault model to determine which alarms to acknowledge and dispatches an acknowledgement event to the relevant fault BB controller in the UIS. This component uses the fault model to determine which alarms to acknowledge and dispatches an acknowledgement event to the relevant fault BB.

Initialization of the fault interfaces UIC and UIS is handled by the fault BB controller component $C-2_F$ in the UIS. The fault controller requests all current state information from the fault BBs 35, 37 and registers for events in the future. The initial bulk requests are converted to many internal fault events for propagation in the model.

When fault events arrive for a network object not yet represented in the UIS model, the identity of network objects is stored using a generic facility. When a new network object is created in the model, the UIS checks to see if fault information was discarded for this object and if so, it requests the missing data from the appropriate fault BB.

What is claimed is:

1. A user interface for a network management system of a communication network, comprising:
    a server for storing the state of said user interface as a whole, marshalling data, and interacting with the remaining of said network management system;
    a client layer for using said server for refreshing a current display presentation of network data to a user, and for transmitting commands selected by a user on said current display presentation to said server.

2. A user interface as claimed in claim 1, structured as a model-view-controller architecture, wherein
    the state information on said server constitutes a high-level model;
    the state information on said client layer constitutes a high-level view; and
    a data marshalling mechanism provided by said network management system constitutes a high-level controller.

3. A user interface as claimed in claim 2, wherein said high-level view comprises one or more views, each responsible for drawing user interface components.

4. A user interface as claimed in claim 2, wherein said high-level controller comprises a collection of building block controllers which interact with a corresponding application of said network manager.

5. A user interface as claimed in claim 2, wherein said high-level view is structured as a model-view-controller architecture, wherein
    a portion of the data stored in the high-level model necessary to achieve the performance demanded for a current user interaction constitutes a low-level model;
    the data for a view on a user terminal constitutes a low-level view; and
    a portion of one or more applications provided by said server constitutes a low-level controller.

6. A user interface as claimed in claim 5, wherein said low-level controller is a mini-controller that interacts both with said high and low level models, to ensure that both models are kept in synchronization.

7. A user interface as claimed in claim 5, said low-level model is a cache for a portion of the data stored in said first level model.

8. A method of structuring functionality of a user interface for a network management system of a communication network into a multilayered model-view-controller pattern, comprising:
    separating said user interface into a server and a client layer;
    integrating the state information on said server in a high-level model;
    integrating the state information on said client layer as a high-level view; and
    integrating a data marshalling mechanism provided by said network management system as a high-level controller.

9. A method as claimed in claim 8, further comprising structuring functionality of said high-level view into a model-view-controller architecture, comprising constituting a portion of the data stored in the high-level model necessary to achieve the performance demanded for a current user interaction into a low-level model;

constituting the data for a view on a user terminal into a low-level view; and constituting a portion of one or more applications provided by said server into a low-level controller.

* * * * *